United States Patent [19]

Menin et al.

[11] 4,034,331
[45] July 5, 1977

[54] FISH COUNTER

[75] Inventors: Albert S. Menin, Sylmar; Robert M. Bridges, Northridge, both of Calif.

[73] Assignee: The Bendix Corporation, North Hollywood, Calif.

[22] Filed: Dec. 29, 1975

[21] Appl. No.: 644,483

[52] U.S. Cl. .................................. 340/3 R; 340/1 C
[51] Int. Cl.² .......................................... G01S 9/70
[58] Field of Search ............................ 340/1 C, 3 R

[56] References Cited
UNITED STATES PATENTS 3,416,127  12/1968  Menin et al. .................. 340/1 C X

*Primary Examiner*—Richard A. Farley
*Attorney, Agent, or Firm*—Robert C. Smith; William F. Thornton

[57] ABSTRACT

A fish counter primarily for counting migrating salmon in streams includes a narrow beamwidth side-scanning sonar transducer which is directed to insonify a volume of water in the stream directly above a mechanical structure serving as an artificial bottom. This structure consists of a lightweight, ladder-like frame with transverse support members of arcuate form over which is stretched a thin skin of sheet metal such as aluminum, thereby providing a structure of great stiffness to avoid sagging. The transducer is supplied with transmitting pulses of short duration at regular intervals. After a delay, a receiver is enabled to permit reception of echo signals returning from any fish crossing the artificial bottom. During the period the receiver is enabled, a ring counter separates the return echoes on the basis of the return time from respective sectors of the bottom structure, and these returns are separately counted for each sector to permit each sector to be read out separately or printed out separately. To separate debris from the fish returns, sampling rates are provided such that each fish is sampled five times but only three valid detections are required at the input to the storage registers to insure a count. Other combinations of these numbers may be used. The counts may be accumulated in total, may be printed out on a sector-by-sector basis, or individual sector counts per given time period may be displayed as requested by an operator. To eliminate inordinately high counts from long term debris which may become fastened to the structure, a counter arrangement is provided which receives all the counts on a sector-by-sector basis and responds to an excessively large number in any sector by disabling that part of the ring counter so that no further counts are accumulated for that sector. The disabled sector remains disabled until the passage of a preset time period of, for example, several minutes after which the counter is cleared. If obstruction remains, the ring counter is again disabled. This condition may be indicated on the print-out tape by means of a special character representing debris.

9 Claims, 7 Drawing Figures

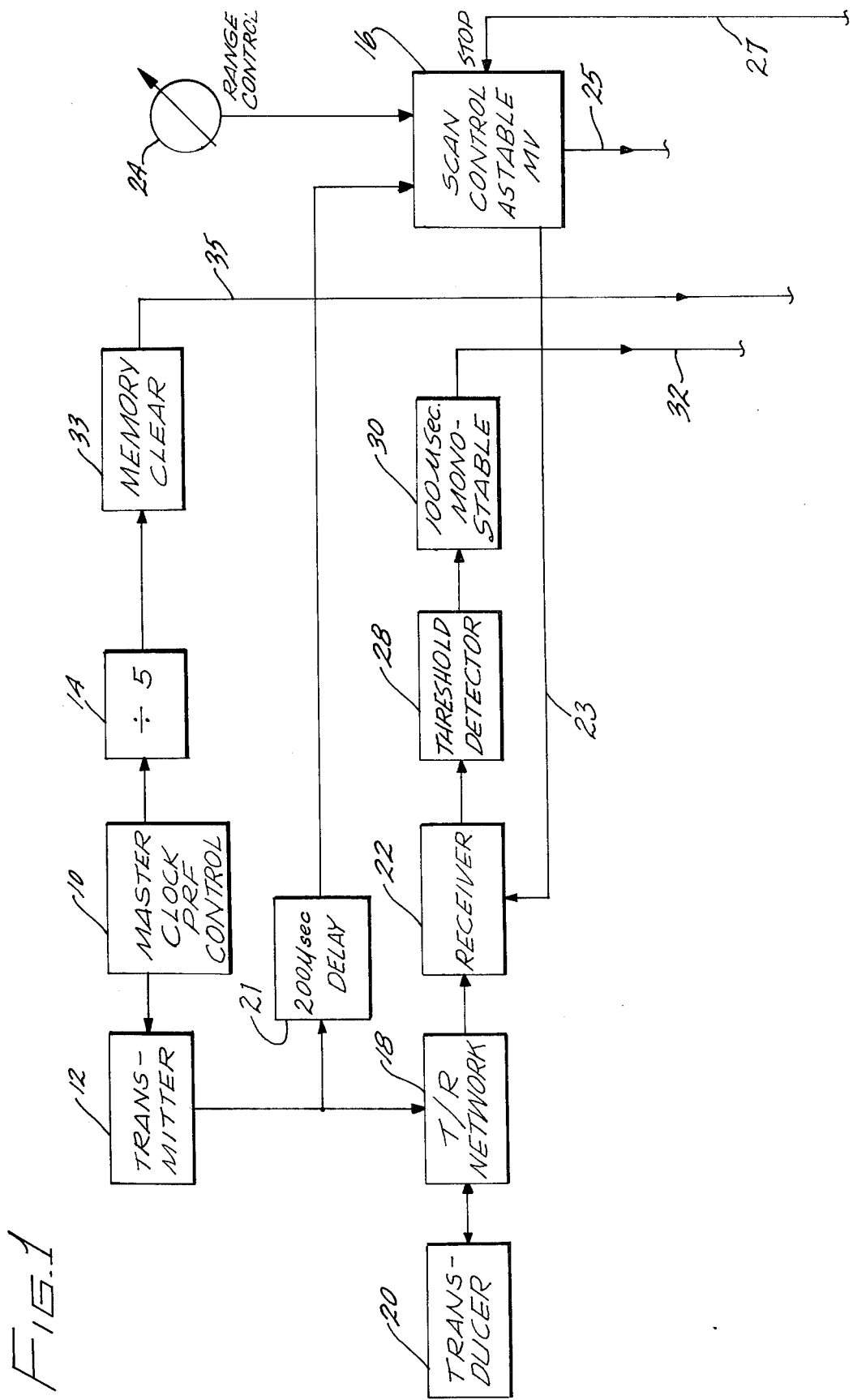

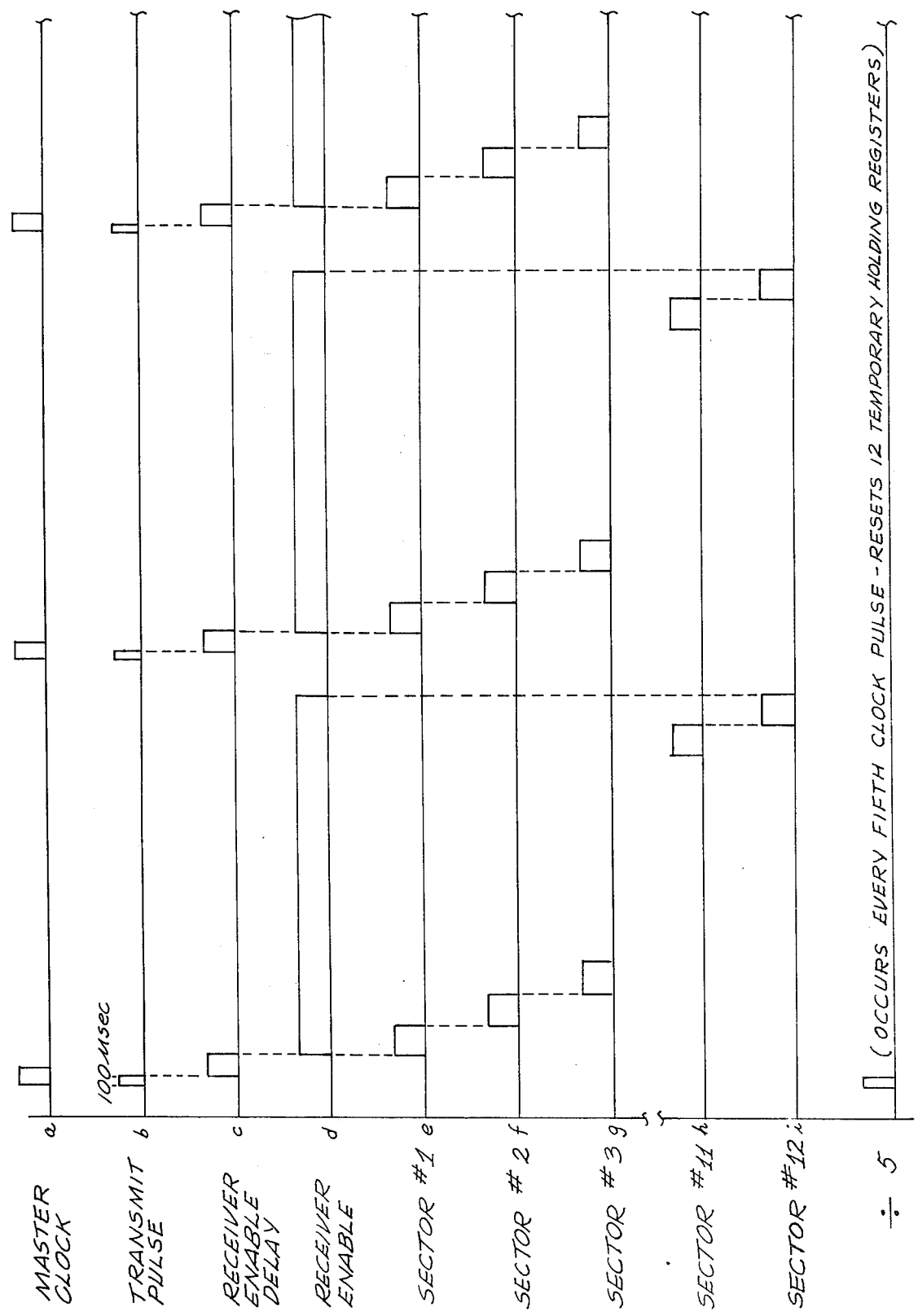

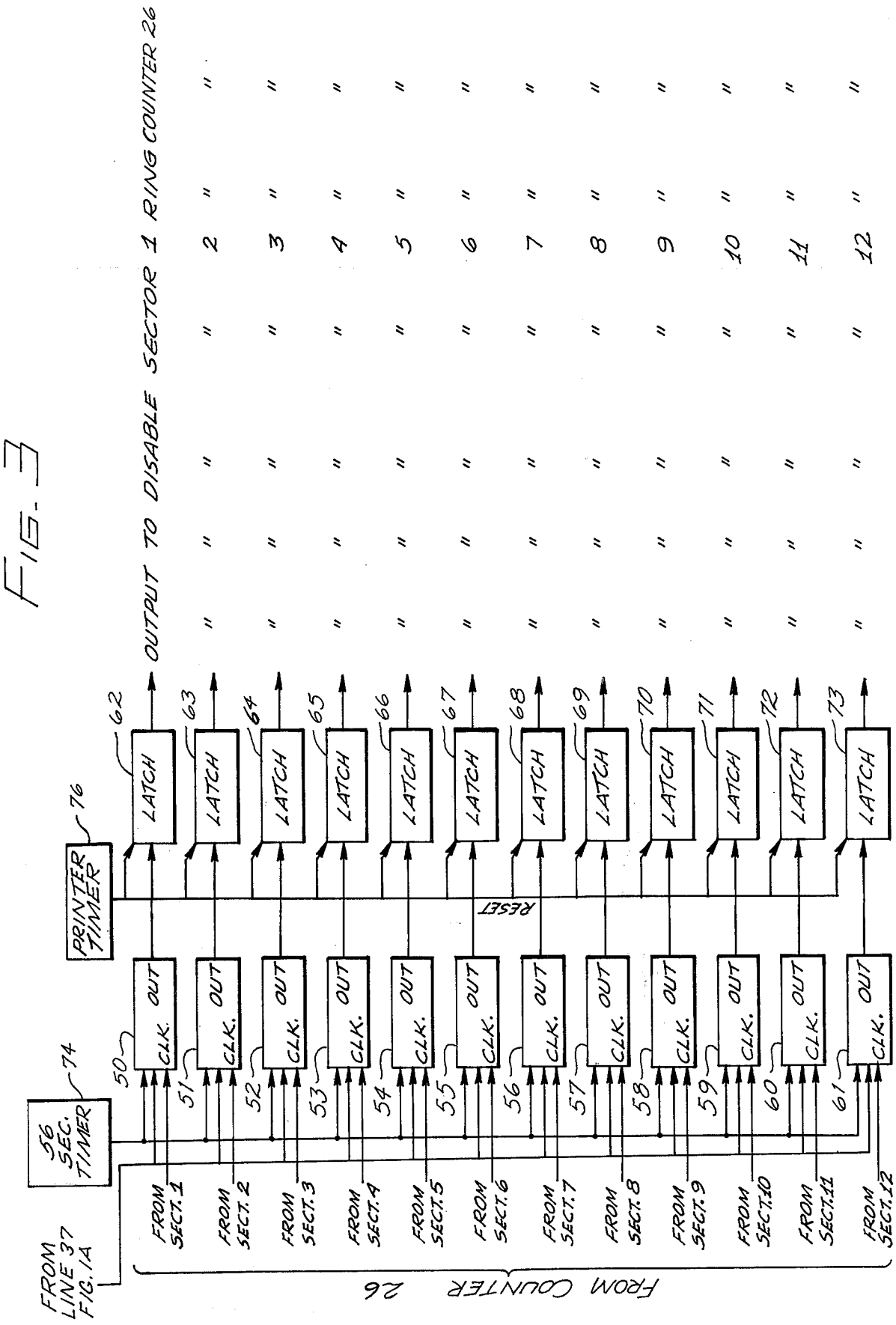

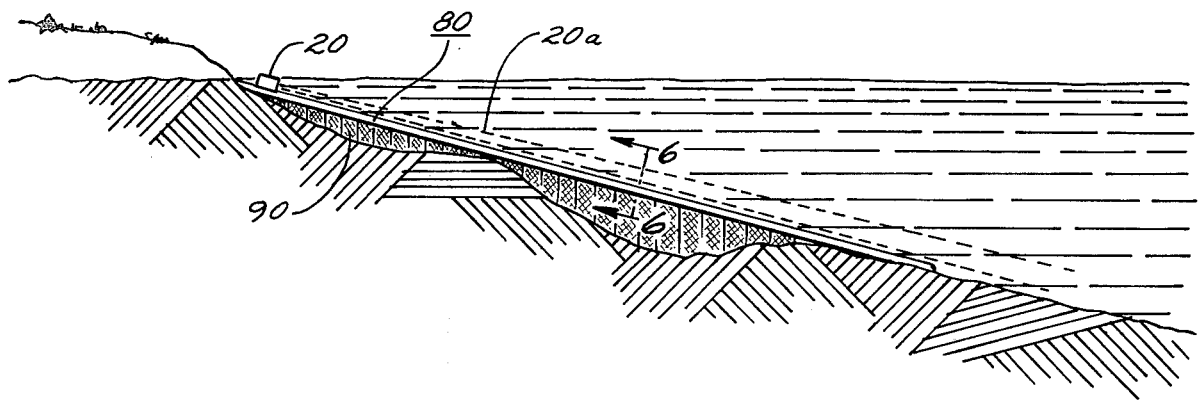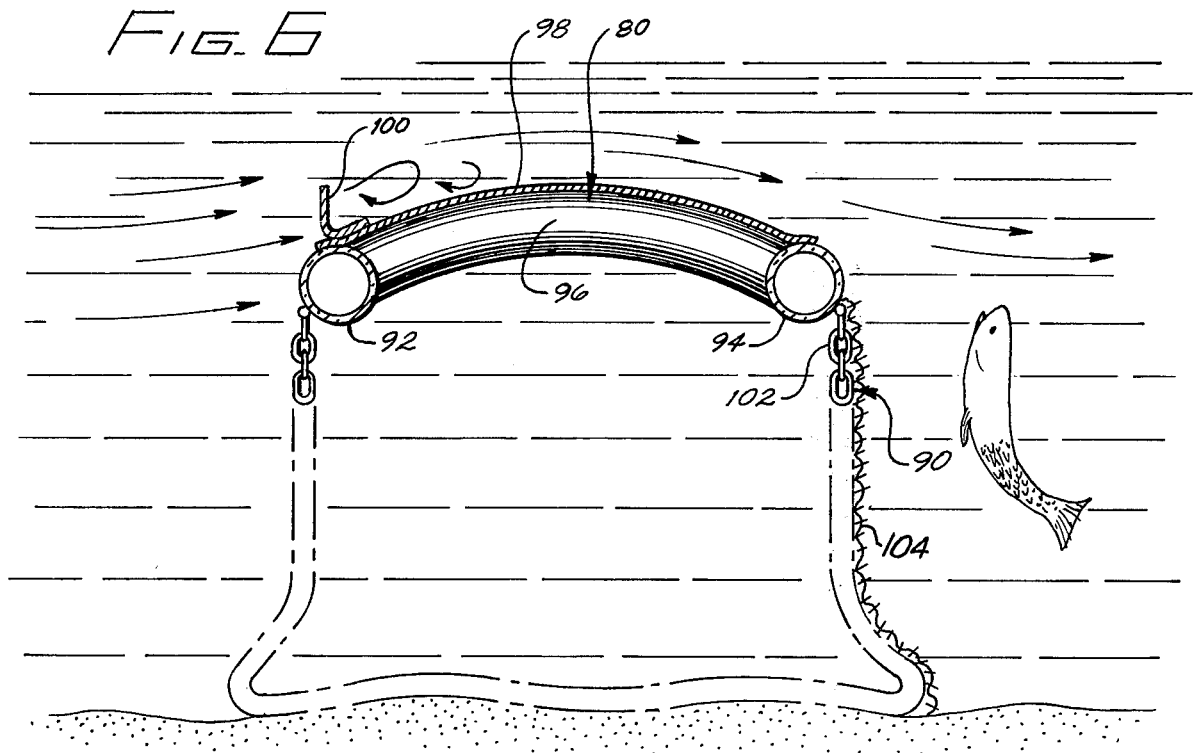

FISH COUNTER

BACKGROUND OF THE INVENTION

For a number of years it has been common practice to use a sonar-type device for counting migrating salmon in streams. One such salmon counter is described in U.S. Pat. No. 3,416,127 to A. S. Menin et al and assigned to the assignee of the present application. The counter shown therein, while quite successful, is expensive to manufacture, largely because of the requirement for a large number of separate upward-looking transducers and several separate receivers. Because of the large number of transducers, this counter is capable of counting accurately in a stream with a very high density of migrating salmon. The transducers are mounted on a ladder-like array structure which is positioned on the stream bottom so that the salmon swim over it. Because the array structure is comparatively flexible, it tends to conform to the contour of the stream bottom sufficiently well that no fish are not counted because of their swimming under the array.

Because of the use of the upward looking transducers, the salmon counter described above requires water of a depth not less than about 3½ feet. And while it counts salmon quite accurately in muddy water, it has no specific means for eliminating debris from the counts; thus it was initially calibrated at a location by adjusting a sensitivity level to correlate with a visual count.

The large numbers of transducers, receivers and associated equipment tend to adversely affect the reliability of this prior salmon counter as well as increasing its cost. There is a need for a counter which is easily deployed into smaller, shallower streams than are appropriate for the prior salmon counter and which is less expensive, more reliable and capable of operating in a stream having a substantial amount of debris without giving a large number of false counts.

SUMMARY OF THE INVENTION

Applicants have determined that by using a single side-scanning sonar transducer, a considerable simplification can be achieved in a salmon counting system. The use of such single transducer introduces a number of problems of its own, however. Since such transducer must necessarily have a very narrow beam pattern to avoid surface and bottom reflections and to assure a reasonably accurate count, the bottom-mounted structure must now serve a different purpose. Instead of carrying an array of transducers, it must serve as an artificial bottom for the stream, forcing the fish to swim over it and preventing them from swimming under it. Since the beam is very narrow, the structure must be quite rigid and free from sag so that as the fish swim over it there is no opportunity for fish to fail to be counted by being in a hollow where the beam does not pass.

By making a ladder-like frame in which the transverse rungs or members are arcuate (out of the plane of the side rails), a truss or beam of significant depth is provided for. A skin of suitable material such as sheet aluminum is secured at many places to the frame producing a monocoque-type truss structure which is quite rigid for its weight. This produces an artificial bottom structure which is nearly straight from end to end to insure that the sonar beam traveling along it (parallel) does not pass over hollows. A plurality of chains carrying webbing, typically of nylon, hang from the downstream side of the frame to the stream bottom such that fish of any significant size are prevented from swimming under the structure.

The sonar beam is emitted during a defined short time period by the transducer which is connected to a master clock. After the transmitted pulse, the clock delays any reception of the signals for an additional period to eliminate "ringing" of the transducer which is a well-known phenomenon. It then supplies an enabling pulse to the receiver and to a scan control multivibrator which actuates a ring counter. Received echo pulses are amplified, threshold detected and converted into pulses of uniform size for processing in the holding registers. The ring counter has a plurality of stages and supplies pulses to divider circuits located on the upstream side of corresponding temporary holding registers, each of which receives echo signals from a sector of the artificial bottom structure so that the operator can determine the distribution of fish across the stream in addition to the total count. Through an arrangement where only a certain percentage of the returns are counted, it becomes possible to separate debris which is normally drifting downstream at a rate approximately that of the stream from salmon which normally move upstream much more slowly. Thus debris will be in the sonar beam for a shorter time than is a fish swimming upstream. The counts representing fish are then retained in holding registers corresponding to each sector counted. A cumulative digital counter keeps track of a total count, a digital printer prints out total counts for each sector for a selected time period, and digital visual display and selector means permit the operator to select and display a count from each sector from the holding register for the selected time period.

An additional feature is the provision for a long time debris sensor which recognizes the existence of a tree branch or similar debris which may become attached to or "hung up on" the artificial bottom structure for some period of time and thus result in the generation of an inordinately large number of counts for a given sector or sectors. This is accomplished by a series of counters, one for each sector, which receive all counts representing fish. A timer acts to reset each such counter to zero after a particular time. If a given number of counts have not been accumulated, the counters are reset and begin to count again. If an excessive number are received in the counter for any sector, that counter has an output which operates a latch disabling one section of the ring counter and its corresponding holding registers. The printer may be caused to respond to this disablement by printing a character on the tape, indicating the presence of debris. This counter and register sector remain disabled until the occurrence of a longer term time pulse which effectively resets the debris counter at the end of a period such as 7½ or 15 minutes.

DESCRIPTION OF THE DRAWINGS

FIG. 1 is a schematic block diagram of a portion of the electrical circuits used in a fish counter according to our invention;

FIG. 2 is a timing diagram relating to the electrical organization of FIGS. 1 and 1A;

FIG. 3 is a schematic block diagram of a debris sensor which may be incorporated in the system of FIGS. 1 and 1A;

FIG. 5 is a side view of the structure shown in FIG. 4; and

FIG. 6 is a sectional view taken along lines 6—6 of FIG. 5.

DESCRIPTION OF THE PREFERRED EMBODIMENT

Figure 1A:
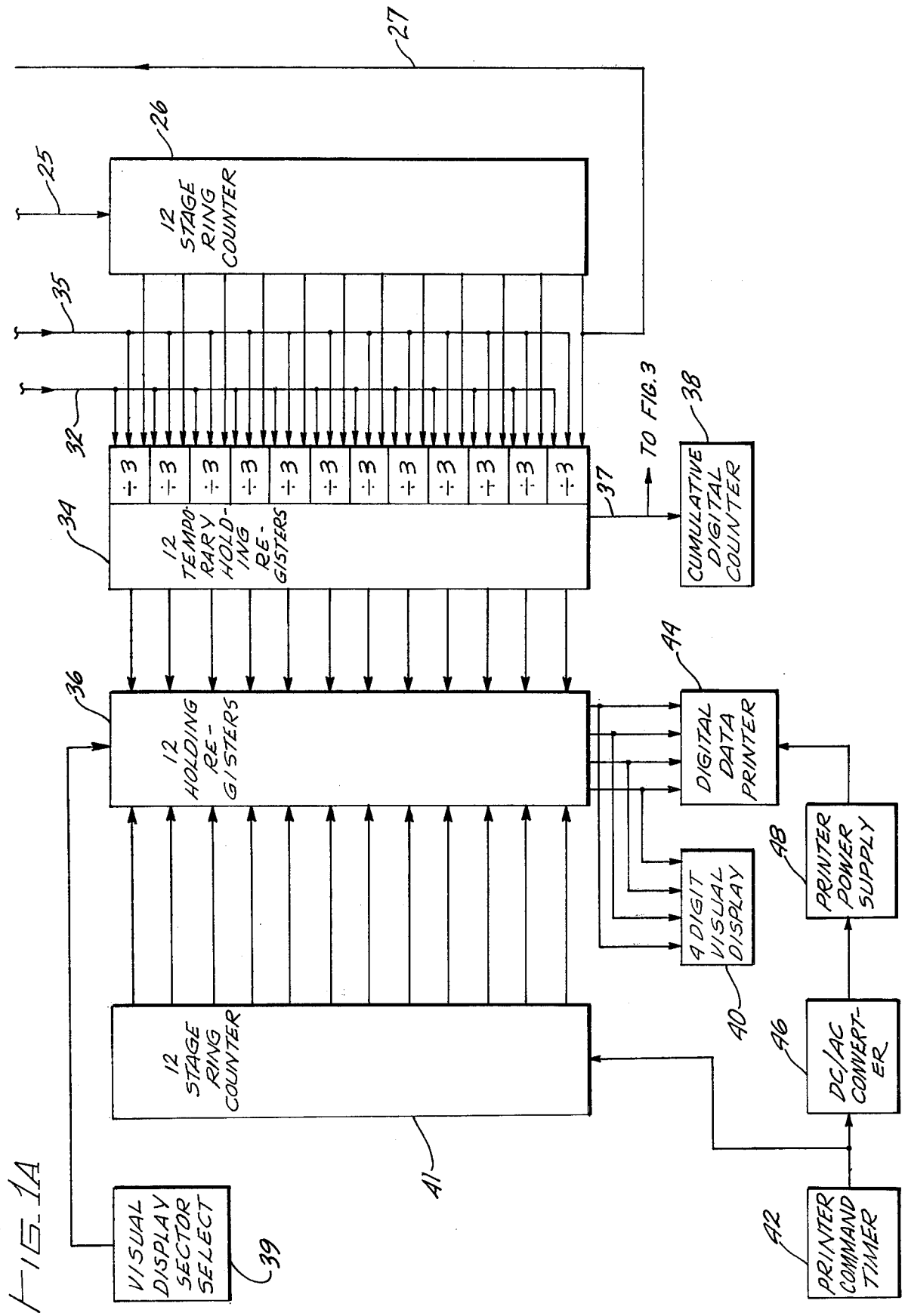
FIG. 1A is a schematic block diagram of the remaining part of the electrical circuitry used in the fish counter of FIG. 1.

Referring now to FIGS. 1, 1A and 2, a master clock 10 PRF control produces pulses in the form of 100-microsecond bursts of 515 KHz which are supplied to a transmitter 12, to a divider 14 (divide by 5), and to a scan control 16 which is in the form of an astable multivibrator. The transmit pulse (see trace $b$, FIG. 2) from transmitter 12 is supplied to a transmit-receive network 18 and from there to an acoustic transducer 20 which transmits a 100-microsecond sonar signal having a 2° beam width. At the end of the 100-microsecond transmit pulse, a 200-microsecond delay is provided by a circuit 21 which is triggered by the trailing edge of the transmit pulse as shown on trace $c$. Following this delay, the scan control 16 then provides a receiver enable signal on line 23 which serves to enable a receiver 22 which then remains enabled for the round trip time required for the transmitted signal to intercept a fish at the maximum range selected by an operator net range control 24 (see FIG. 2, trace $d$). The receiver enable signal supplied to scan control 16 is transmitted through a line 25 to a 12-stage ring counter 26 which sequentially opens one of 12 gates permitting any data received to be entered in the register corresponding to the 1/12 of the river sector in which fish were detected (see traces $e, f, g, h$ and $i$). Depending on the round trip time to a transmitted signal, the return echo signals are divided by time to represent a count of fish in each of 12 sectors of the river. After the signals from the twelfth sector are received and transmitted, a pulse is transmitted along a line 27 to provide a "stop" signal which stops the scan control multivibrator 16 until the arrival of the next pulse from master clock 10.

Echo signals received at the receiver 22 are amplified to a usable level and are then supplied to a threshold detector 28. This detector responds to signals of sufficient amplitude to be the equivalent of the known target strength of a fish. Echoes exceeding this predetermined threshold are supplied to a 100-microsecond monostable multivibrator 30 which thus provides signal pulses which become standard for all fish-strength echoes. The output pulses from the monostable multivibrator 30 are supplied along line 32 to each of the 12 divider circuits at the inputs to each of the 12 temporary holding registers forming register 34, which divider circuit depending upon which is enabled by the ring counter 26.

Three signal pulses occurring within the enablement time for any of the 12 equal distance sectors will result in one count being routed to the corresponding sector of a 12-section holding register 36. Another input signal supplied to the temporary holding registers 34 comes from the divider circuit 14 (divide by 5) which responds to every fifth master clock pulse to supply a timing pulse to a "memory clear" device 33, providing an output pulse on a line 35 which clears all counts from the temporary holding register 34 after which the registers are free to receive new data.

The rate of migration of salmon along the river bottom is about 1.75 feet per second, and the sampling rate is selected such that although each fish is normally sampled five times, only three valid detections are required to provide an input to register 36. This feature performs two functions:

1. It permits the sampling of five different aspects of the same fish to increase the probability of fish detection, and 2. It substantially eliminates false counts due to water-borne debris, since most rivers where salmon migrate move at velocities in excess of 4 feet per second. Thus water-borne debris will be in the beam much less time than the salmon and will not be in the sonar beam for the three required valid detections.

So considering any one "÷ 3 circuit" of register 34 and inputs thereto, this sector is enabled for a short period by the corresponding stage of the 12-stop ring counter 26. During this period, if three signal pulses are not received no input signals are supplied to the corresponding sector of register 36. If three or more signal pulses are received, one pulse will be supplied to register 36. Densities will not normally be such that more than one pulse is supplied to register 36 before holding registers 34 are cleared. Thus any echoes meeting the criterion of being above the predetermined threshold for three out of five transmissions are thus entered in thier respective range slots of the temporary register 34 and then routed to register 36 as a single count. They are also routed through a line 37 to a single permanent cumulative memory and digital counter 38 where they are totalized. At any desired time, the operator may select by means of a selector switch 39 connected to holding register 36 any one if its 12 river sectors for display on a visual display device 40 to see how many fish have been detected in each of the 12 river sectors. Additionally, at operator-selected intervals a printer command timer 42 will cause the printer 44 to sequentially sample and print out each of the fish totals stored in the 12 sectors of register 36 to determine the lateral and chronological distribution of the fish migration. An operator-set switch (not shown) permits the user to cause the printed and displayed sector data to be either cumulative (a running total for each of the 12 sectors) or incremental (automatic reset to zero after each print interval).

Since the power source for the counter is normally a conventional automotive storage battery, the direct current output of this battery is normally converted to alternating current in a d.c. to a.c. converter 46, and the a.c. output is supplied to a power supply 48 for operating the printer 44. Because the power consumption must be minimized, power to the receiver is automatically provided only during the receiver enable cycle and to the printer only during the time it is commanded to sequentially print the 12 river sector fish totals.

Because of the possibility that a tree branch or some other type of debris could become entangled or held to a portion of the artificial bottom structure, a debris sensor may be incorporated. Since such debris will tend to result in a very high number of reflections in a given period of time, a number significantly higher than would be caused by fish, the occurrence of such a number may be sensed and used to cause the corresponding portion of the register to discontinue storing counts.

Means for accomplishing this are shown in FIG. 3. In this system the occurrence of 56 counts within a 56-second period within any 1/12 section of the artificial bottom structure is assumed to be debris and not fish. Other criteria could be used depending upon the normal fish densities to be expected. A series of 12 counters 50–61 is provided, each of which samples counts from one river sector as accumulated in holding registers 34 and supplied from line 37. A 56-second timer 74 is connected to each of said counters and automatically resets each to zero every 56 seconds. Thus, in normal operation no individual counter will accumulate 56 counts in 56 seconds, and so all counts are cleared. If counter 60, for example, were to accumulate over 56 counts before the clearing reset pulse arrives, counter 60 will then supply an output pulse to a latch circuit 72 which is one of 12 latches 62–73. Latch 72 will then supply an output pulse to disable sector 11 of the ring counter 26, thus discontinuing any transfer of counts to register 34. A reset pulse is also supplied to latches 62–73 from a timer 76 which conventionally forms part of the digital data printer 44. This print command reset cycle will normally be of substantially longer duration than the 56-second reset described above. Typically, such print command reset times are 7.5 minutes, 15 minutes, etc. The purpose of this reset function is to bring the disabled sector back into operation if the debris has cleared itself in a matter of a few minutes. Should the debris still be present, the above cycle will repeat, thus effectively keeping the disabled sector off the line. Whenever the debris is cleared, the sector will again operate at the end of the succeeding print command reset cycle. While the reset pulse to the latches 62–73 is described as being supplied from the printer timer, it could as well come from a separate timing device. Similarly the 56-second reset signal could come from the printer timer or any suitable source of timing signals. Neither of these timing signals need be coordinated with the master clock 10. One additional feature of the printer timer arrangement is that it can be easily made to respond to the actuation of one of the latches by printing a character on the print-out record to indicate at which of the long-term reset cycles the debris was sensed, for how many of the long-term reset cycles the sector was disabled, and when, if at all, the debris was cleared and the fish were again counted for the previously disabled sector.

Figure 4:
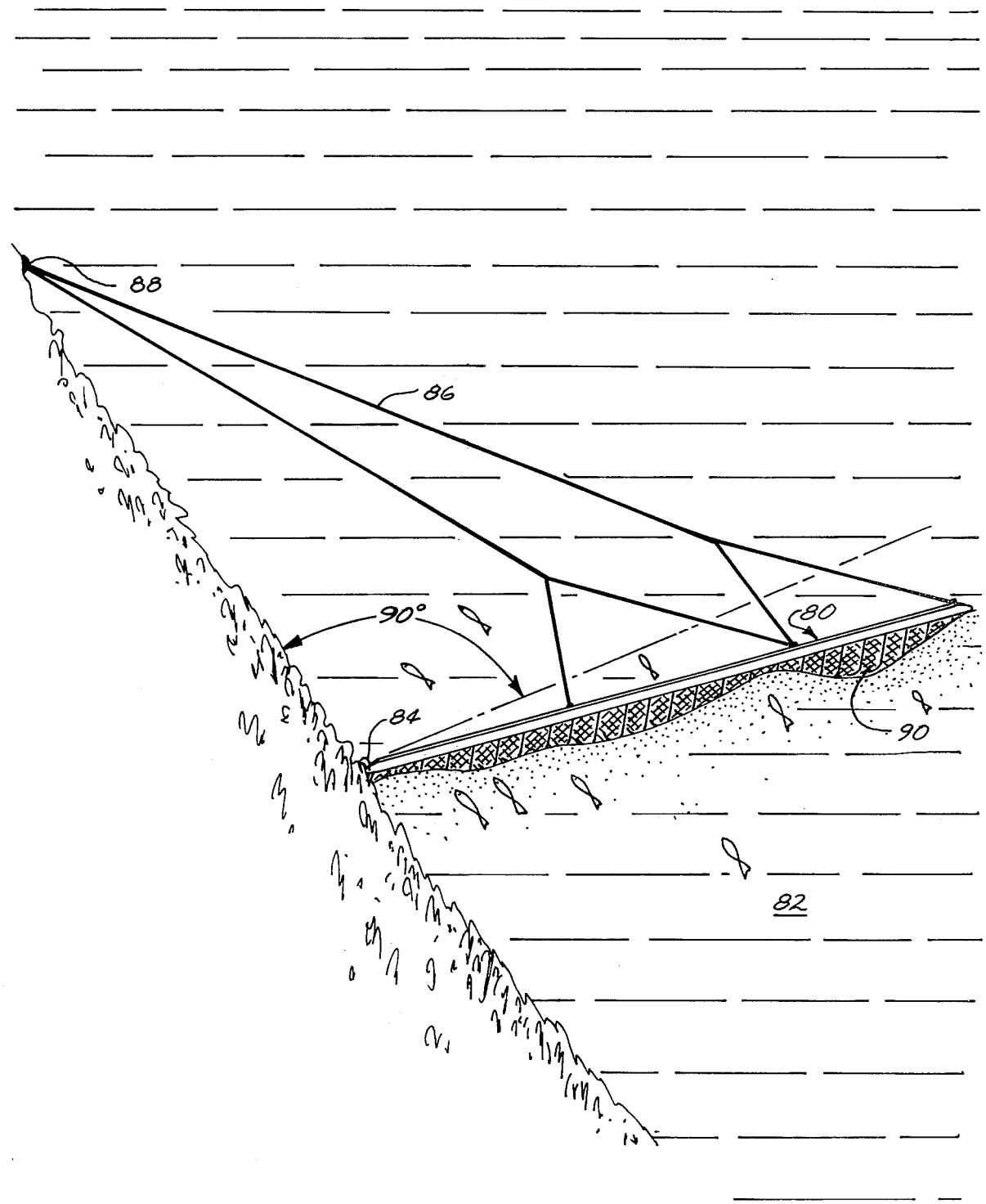
FIG. 4 is a perspective view of the artificial bottom structure used with the electrical organizations of FIGS. 1, 1A and 3 as deployed in a stream.

The arrangement for deploying the artificial bottom is shown in FIGS. 4, 5 and 6. FIG. 4 is a perspective view of our artificial bottom structure 80 which is in the form of a truss or beam pivotally fastened at numeral 84 by suitable mounting means shown to the shore of a stream 82. The supporting means which holds structure 80 in a position essentially normal to the shoreline consists of a cable arrangement 86 attached to the shoreline at a point designated by numeral 88 upsteam of pivot point 84. As shown, the cable arrangement 86 consists of two cables, each of which includes a pair of branching cables connected to structure 80 so that there are enough points of support for structure 80 to avoid substantial deformation or "bowing" due to action of the current. A flexible open wall of chains and webbing 90 depends from structure 80 to force the fish swimming upstream to pass over structure 80. The structure 80 is shown in FIG. 4 in the water resting essentially on the bottom with the surface indicated by the dash-dot line.

A side view of the arrangement shown in FIG. 4 appears in FIG. 5. The rigid structure 80 is shown resting on the bottom of the stream, and chains and webbing 90 are suspended from structure 80 to fill in the spaces caused by surface irregularities on the stream bottom to thereby force the fish to swim over structure 80. The sonar transducer 20 is shown in the water adjacent the shoreline projecting a narrow sonar beam 20 along and immediately above the surface of structure 80.

FIG. 6 is a substantially enlarged sectional view of the structure 80 with chains and webbing 90 taken along line 6—6 of FIG. 5. In this view structure 80 is seen as including a beam having hollow tubular side rails 92 and 94 with arcuate tubular "rungs" or bridging members 96 extending therebetween. Members 92, 94 and 96 are typically of a plastic polyvinyl chloride (PVC). There will be many such members 96 since they will normally be placed about 2½ feet apart over a span of 50 feet of structure 80. The hollow side rails make the structure positively buoyant to aid in deployment. When in position over the desired location, these rails are flooded to cause the structure to sink to the bottom. When it is desired to retrieve it, air is forced into the side rails, and it is again floated to the top. A one-way valve (not shown) at the far end of the side rails permits exiting of air and water as needed. Fastened to the top of the beam formed by members 91, 94 and 96 is a thin skin 98 of sheet metal such as aluminum which, in configuration with members 92, 94 and 96 produces a very rigid monocoque-type structure having very substantial stiffness such that it can bridge most hollows in the stream bottom without sagging appreciably. The aluminum skin 98 tends to be substantially in tension or compression and, as secured in an accurate shape, also has significant depth, thereby acting in combination with the beam to form a structure 80 of considerable strength and rigidity.

Because of the arcuate surface formed on the top of structure 80, it may tend to rise in a swift current in a manner somewhat like an airfoil. Where current velocities are such that this becomes significant, a small stringer of "L" shaped cross-section 100 may be attached along the upstream edge to act as a "spoiler".

The wall 90 of chains and webbing is shown in detail with each end of a chain section 102 attached to one of the side rails 92 or 94. The nylon webbing 104 is shown fastened to the chain on the downstream side only, and this webbing, supported by the chains, effectively blocks any path under the structure 80 and forces the salmon to swim over the structure 80 where they can be seen in the sonar beam 20a.

Those skilled in the art will recognize a number of ways which the above fish-counting assembly could be made different from that described. The beam or truss structure, although made of PVC because of low cost and a need to make it light for portability, could be of other materials, some of which may be more rigid. Conventionally, the PVC truss structure and skin will be assembled from sections and panels of convenient length for carrying on trucks or aircraft. The aluminum skin adds very substantially to the rigidity of the truss, but it could be made even more rigid by using a skin of steel; however, this would result in greater weight. And while the numbers of sectors separately considered has been defined as 12, either smaller or larger numbers may be used. Where fewer sectors are acceptable, some reduction in the complexity of the electrical interconnections can be effected by using ten sectors, since ten-stage registers are commercially available. Another variable factor includes the dividers shown at numerals 14 and 34. While these provide three valid detections out of five samples, it may be that for any particular stream two, three or four detections out of four, five, six or seven sampling pulses may be preferable, and means for varying these divisors may be incorporated into the dividers 14 and 34.

We claim:

1. A system for counting migrating fish swimming in a stream comprising:

a mechanical support structure adapted to be positioned on the bottom of said stream near the shore thereof extending a substantial distance into said stream essentially perpendicularly with respect to the direction of stream flow, said structure comprising a lightweight elongated tubular frame;

webbing means suspended from the downstream side of said structure to prevent fish of substantial size from passing under said support structure;

an acoustic transducer having a narrow beam width positioned adjacent the shore end of said structure and directed to insonify a volume of water in said stream immediately above said structure, and to receive echo return signals therefrom;

and electrical means connected to said transducer including a source of electrical power, a master clock connected to said source for emitting pulses at regular intervals, a transmitter responsive to said clock pulses for providing echo ranging pulse signals to said transducer, a delay circuit responsive to said transmitted pulses, a receiver and threshold detector means connected to said receiver, multivibrator means responsive to signals passed by said threshold detector for providing pulse signals of essentially uniform magnitude representing fish returns, a multistage ring counter providing a plurality of successive output pulses;

a scan control multivibrator responsive to said delay circuit for enabling said receiver and for enabling said ring counter, a first holding register having a plurality of stages corresponding to the number of stages of said ring counter including a divider circuit at the input to each stage and connections from each stage of said ring counter to a corresponding one of said divider circuits to thereby provide pulse signals to each stage of said holding register representing one sector along the length of said mechanical support structure;

means connecting said multivibrator means to each of said divider circuits;

divider circuit means connected to said master clock, and means responsive to said divider circuit means output for providing a clearing or reset signal to each of said divider circuits;

a second holding register having a number of stages corresponding to the number of stages of said ring counter and said first named holding register and means interconnecting corresponding stages of said holding registers;

display means connected to said second holding register including timer means, and second ring counter means responsive to said timer means and connected to said second holding register for causing the accumulated counts in said second holding register to be displayed on said display means.

2. A system for counting migrating fish as set forth in claim 1 wherein said display means includes a digital data printer including timing means, said timing means being adjustable to print out the contents of each stage of said second holding register.

3. A system for counting migrating fish as set forth in claim 1 wherein said display means also includes digital visual display means and operator-operated means for selecting the display representing the count for the desired sector of said mechanical support structure.

4. A system for counting migrating fish as set forth in claim 1 wherein a cumulative digital counter is connected to the output of said first holding register.

5. A system for counting migrating fish as set forth in claim 1 wherein said scan control multivibrator is adjustable to vary the distance from the transducer from which return echo signals will be accepted.

6. A system for counting migrating fish as set forth in claim 1 wherein said ring counter includes means responsive to the expiration of the period for reception of echoes from the most distant sector of said mechanical support structure for providing a pulse to said scan control multivibrator to disable said receiver.

7. A system for counting migrating fish as set forth in claim 1 wherein said divider circuits and said divider circuit means are each independently adjustable to vary their divisors.

8. A system for counting migrating fish as set forth in claim 1 wherein a long time debris sensor is provided including a counter for each of said holding register stages, said holding register counters being capable of accumulating a large number of counts, means connecting the output of said first holding register to said counters, means responsive to the passage of a given time period for resetting said counters to zero, and latch means responsive to the occurrence of an output from any one of said counters for disabling the corresponding section of said ring counter to cause said holding registers to discontinue accumulating counts from the corresponding section of said mechanical support structure.

9. A system for counting migrating fish as set forth in claim 1 wherein said mechanical support structure comprises a lightweight frame with elongated side rails, a plurality of arcuate transverse members connecting said side rails, and a skin of sheet metal fastened to the top of said side rails and transverse members and extending essentially the entire length of said structure.

* * * * *